US010803029B2

(12) United States Patent
Holm et al.

(10) Patent No.: US 10,803,029 B2
(45) Date of Patent: Oct. 13, 2020

(54) GENERATING JAVASCRIPT OBJECT NOTATION (JSON) SCHEMA FROM JSON PAYLOADS

(71) Applicant: salesforce.com, inc., San Francisco, CA (US)

(72) Inventors: Mitchell G. Holm, Fishers, IN (US); Ryan D. Woebkenberg, Carmel, IN (US); Vinesh Mani, Fishers, IN (US)

(73) Assignee: salesforce.com, inc., San Francisco, CA (US)

( * ) Notice: Subject to any disclaimer, the term of this patent is extended or adjusted under 35 U.S.C. 154(b) by 413 days.

(21) Appl. No.: 15/847,811

(22) Filed: Dec. 19, 2017

(65) Prior Publication Data

US 2019/0188288 A1    Jun. 20, 2019

(51) Int. Cl.
*G06F 16/30* (2019.01)
*G06F 16/21* (2019.01)
*G06F 8/30* (2018.01)
*G06F 16/28* (2019.01)

(52) U.S. Cl.
CPC .............. *G06F 16/211* (2019.01); *G06F 8/30* (2013.01); *G06F 8/315* (2013.01); *G06F 16/289* (2019.01)

(58) Field of Classification Search
CPC .......... G06F 8/315; G06F 16/289; G06F 8/30; G06F 16/211
USPC ....................................................... 707/804
See application file for complete search history.

(56) References Cited

U.S. PATENT DOCUMENTS

| 7,730,478 | B2 | 6/2010 | Weissman | |
|---|---|---|---|---|
| 2014/0317169 | A1* | 10/2014 | Shimizu | G06F 16/972 709/203 |
| 2017/0201499 | A1* | 7/2017 | McLaughlin | H04L 9/0838 |
| 2018/0063216 | A1* | 3/2018 | Subramanian | H04L 67/12 |
| 2019/0073666 | A1* | 3/2019 | Ortiz | G06F 21/62 |
| 2019/0188288 | A1 | 6/2019 | Holm et al. | |

OTHER PUBLICATIONS

Christophe Salzmann, Sten Govaerts, Wissam Halimi, Denis Gillet: The Smart Device Specification for Remote Labs, Submitted on Oct. 14, 2015 (Year: 2015).*

(Continued)

*Primary Examiner* — Kuen S Lu
(74) *Attorney, Agent, or Firm* — Nicholson De Vos Webster & Elliott LLP

(57) ABSTRACT

Implementations of the invention generate a JavaScript Object Notation (JSON) schema for an application programming interface (API) endpoint that is not documented in a machine understandable schema. In one implementation, a plurality of JSON payloads that were successfully requested using a same endpoint are automatically obtained, and a composite payload is automatically created based on the plurality of JSON payloads that were obtained. Then a JSON schema that documents the API endpoint is automatically generated based on the composite payload. The generating comprises for each field of the composite payload, determining whether the field is optional or mandatory based on a number of the data items that are in the composite payload for the field, and determining a data type of the field based on the data items in the composite payload for the field.

20 Claims, 13 Drawing Sheets

(56) References Cited

OTHER PUBLICATIONS

Salesforce, "Force.com REST API Developer Guide", Version 41.0, Winter '18, Nov. 2, 2017, 232 pages.
"OpenAPI Specification", <<<https://github.com/OAI/OpenAPI-Specification/blob/master/versions/2.0.md>>>retrieved on Oct. 26, 2017, 42 pages.

* cited by examiner

Fig. 6A

```
PAYLOADS
{
  name: "Bill Albert",
  customerKey: 2234-22AB8C-AC23F9,
  assetType: {
    id: 1023,
    name: "Adobe/PNG",
    displayName: "PNG"
  },
  file: "Tortoise.png",
  category: {
    id: 21573
  },
  content: *base64 file encoding*,
  id: 12180-12789-072356
}
```
Payload 602

```
{
  name: "Ryan Howe",
  customerKey: 1246-135AC7-E737CC,
  assetType: {
    id: 1022,
    name: "Adobe/JPEG",
    displayName: "JPEG"
  },
  file: "10573.jpg",
  category: {
    id: 8682
  },
  content: *base64 file encoding*,
  slots: ["worker-composite-4"],
  id: 12180-12789-072356
}
```
Payload 604

```
{
  name: "Tony Oaks",
  customerKey: C141-AD8192-818CAB,
  assetType: {
    id: 1022,
    name: "Adobe/JPEG",
    displayName: "JPEG"
  },
  file: "adCampaignMarch(1).jpg",
  category: {
    id: 4142
  },
  content: *base64 file encoding*,
  design: "Marketing_Plan01"
  slots: ["worker-composite-2"],
  id: 2397-23890-2388
}
```
Payload 606

Fig. 6B

```
SCHEMA 650
{
  "paths": {
    "/asset/v1/Content/Assets/{Id}": {
      "patch": {
        "tags": "asset",
        "summary": "Partial update an Asset",
        "description": "Partial update an Asset",
        "parameters": [
          {
            "name": "Id",
            "in": "query",
            "description": "",
            "required":"true",
            "type": "number"
          },
          {
            "name": "body",
            "in": "body",
            "description": "JSON Parameters",
            "schema": {
              "$ref": "#/definitions/_Content_Assets.Patch"
            }
          }
        ]
      }
    }
  },
  "definitions": {
    "_Content_Assets.Patch": {
      "type": "object",
      "required": true,
      "properties": {
        "name": {
          "description": "",
          "type": "String",
          "required": true
        },
        "customerKey": {
          "description": "",
          "type": "String",
          "required": true
        },
        "assetType": {
          "id": {
            "description": "",
            "type": "Number",
            "required": true
          },
          "name": {
            "description": "",
            "type": "String",
            "required": true
          },
          "displayName": {
            "description": "",
            "type": "String",
            "required": false
          }
        },
        "file": {
          "description": "",
          "type": "String",
          "required": true
        },
        "category": {
          "id": {
            "description": "",
            "type": "Number",
            "required": true
          }
        },
        "content": {
          "description": "",
          "type": "String",
          "required": false
        },
        "design": {
          "description": "",
          "type": "String",
          "required": false
        },
        "slots": {},
        "id": {
          "description": "",
          "type": "Number",
          "required": true
        }
      }
    }
  }
}
```

Fig. 6D

```
COMPOSITE PAYLOAD 670
{
    name: ["Ryan Howe", "Bill
Albert", "Tony Oaks"],                    Mandatory field 672
    customerKey: [C141-AD8192-
818CAB, 2234-22AB8C-AC23F9,
1246-135AC7-E737CC],
    assetType: {
        id: [1022,1023,1022],              Number data type 676
        name: ["Adobe/
JPEG","Adobe/PNG","Adobe/
JPEG"],
        displayName:
["JPEG","PNG","JPEG"]                     String data type 678
    },
    file:
["adCampaignMarch(1).jpg","T
ortoise.png","10573.jpg"],
    category: {
        id: [4142, 21573, 8682]
    },
    content: [*base64 file
encoding*,*base64 file
encoding*,*base64 file
encoding*],
    design:
["Marketing_Plan01"],
    slots: [["worker-
composite-2"],["worker-       Optional field 674
composite-4"]],
    id: ["2397-23890-
2388","12180-12789-
072356","12180-12789-
072356"]
}
```

Fig. 6E

```
SCHEMA SEGMENT SPECIFYING
RANGE 680
{"id": {
        "description": "",
        "type": "Number",
        "required": true,
        "maximum": 10000,
        "minimum": 1,

```
PAYLOAD' (GENERATED PAYLOAD)
690
{
   name: "SCuQ XkUQWmSu",
   customerKey: 2234-22AB8C-
AC23F9,
   assetType: {
      id: 351,
      name: "Adobe/PnjGS",
      displayName: "PNG"
   },
   file: "SidA8.jwp",
   category: {
      id: 9177
   },
   content: *base64 file
encoding*,
   id: 12180-12789-072356
}
```

```
PAYLOAD (RETRIEVED PAYLOAD)
602
{
   name: "Bill Albert",
   customerKey: 2234-22AB8C-
AC23F9,
   assetType: {
      id: 1023,
      name: "Adobe/PNG",
      displayName: "PNG"
   },
   file: "Tortoise.png",
   category: {
      id: 21573
   },
   content: *base64 file
encoding*,
   id: 12180-12789-072356
}
```

Query command input 702

"index=apilog rs.s=200 a=asset | table v,a,r.m,r.r,i |
dedup 3 r.r,v,r.m"

CSV file output 704

| | A | B | C | D | E | F | G | H |
|---|---|---|---|---|---|---|---|---|
| 1 | v | a | r.m | r.r | | i | | |
| 2 | s1 | asset | GET | /asset/v1/AssetTypes | | af2fcba2-dfcc-4d96-ba10-e1b1850c5bcb | | |
| 3 | s1 | asset | PUT | /asset/v1/Content/Assets/{id} | | 9f4dab79-66cc-4843-bdfd-aee78a21d7ec | | |
| 4 | s1 | asset | GET | /asset/v1/Content/Assets/{id} | | 00e59872-aab2-4c61-b2f1-7a45f996a9f8 | | |
| 5 | s1 | asset | POST | /asset/v1/Content/Assets/query | | cf428c34-950f-45ef-a6a9-83579d7fe0fb | | |

```
┌─────────────────────────────────────────────────────────────────────────┐
│ Automatically obtain a plurality of JSON payloads that were successfully requested using a same │
│ endpoint, wherein each of the plurality of JSON payload includes a set of one or more fields and a │
│                    data item for each of those fields. 802                      │
└─────────────────────────────────────────────────────────────────────────┘
  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
  │ Identify from a log, which records an endpoint and an indication of success for each request to │
  │ the JSON payloads, a plurality of the requests to the same endpoint that were successful per │
  │ the indications (remove one or more duplicated requests from the plurality of requests). 812 │
  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
  ┌─────────────────────────────────────────────────────────────────────┐
  │ Obtain the plurality of JSON payloads from the datastore of the plurality of the requests │
  │ identified as having the same endpoint and that were successful per the indications. 814 │
  └─────────────────────────────────────────────────────────────────────┘
```

Automatically create a composite payload based on the plurality of JSON payloads that were obtained, wherein the composite payload includes the fields and the respective data items for the fields in the plurality of JSON payloads that were obtained. 804

Automatically generate a JSON schema that documents the API endpoint based on the composite payload. 806

Determine whether the field is optional or mandatory based on a number of the data items that are in the composite payload for the field. 816

Determine a data type of the field based on the data items in the composite payload for the field. 818

Determine a range for that field based on the data items for that field in the composite payload. 820

Determine a content characteristic for the field based on the data items for that field in the composite payload. 822

Create a software development kit (SDK) using the JSON schema. 814

GENERATING JAVASCRIPT OBJECT NOTATION (JSON) SCHEMA FROM JSON PAYLOADS

TECHNICAL FIELD

One or more implementations relate to the field of JavaScript Object Notation (JSON) schema generation; and more specifically, to the generation of a JSON schema from JSON payloads.

BACKGROUND ART

An API endpoint (or REpresentational State Transfer (REST) API endpoint, endpoint, these terms are used interchangeably in this document) may take a number of parameters, perform a specific function, and return data to a user. The specific function may be an operation such as retrieving an API index, updating a post, or deleting a comment.

An API endpoint may be specified by a request route and a request method. A request route (or route, and the two terms are used interchangeably) includes an identifier that a user uses to access an endpoint. The identifier may be a uniform resource identifier (URI), which may be a uniform resource locator (URL) or a uniform resource name (URN). A request method (also referred to as a method) indicates a desired action to be performed on a resource. A method may include one or more of the following: GET, HEAD, POST, PUT, DELETE, TRACE, OPTIONS, CONNECT, PATCH, etc. Using an endpoint, a user may request a JavaScript Object Notation (JSON) payload from a datastore.

An application programming interface (API) endpoint may be "documented in a machine understandable schema" (also referred to as "documented") using a JSON schema that complies with a standard such as the OpenAPI specification. A JSON schema specifies a JSON-based format to define the structure of JSON data for validation, documentation, and interaction control. It provides a framework for a JSON payload required by a given application, and how that data can be modified. Such a standard-based JSON schema may be used to run automation tests based on the schema definition (defined by the JSON schema) or to create software development kits (SDKs) in various languages.

An API endpoint that is not "documented in a machine understandable schema" may be a REST API endpoint that is developed without using an OpenAPI defined JSON schema. Such an API endpoint is often referred to as an undocumented API endpoint. Generating a JSON schema using payloads retrieved by an "undocumented" API endpoint is challenging. Having undocumented API endpoints is problematic because these undocumented API endpoints can't be readily used by other developers. The other developers need either to ask the original developers how the undocumented API endpoints are structured, or to construct a JSON schema on their own, both can be time-consuming processes. Yet many API endpoints were developed before the evolution of standards such as the OpenAPI specification.

Existing solutions to document undocumented API endpoints generate a standard JSON schema one payload at a time. For example, a JSON to Schema Editor may convert a JSON payload to a JSON schema when a human user copies and pastes the JSON payload to the Editor. Another tool, a JSON-to-JSON-Schema Node Package, may also convert a JSON payload to a JSON schema when a user imports the JSON payload into the Package. Thus, generating JSON schemas efficiently for the REST API endpoints that predate standards is challenging.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 6A illustrates a plurality of JSON payloads.

FIG. 6B illustrate a JSON schema based on multiple payloads.

FIG. 6D illustrates a composite payload according to some implementations.

FIG. 6E illustrates a schema segment that specifies a range for a field according to some implementations.

FIG. 6F compares a generated payload to a retrieved payload according to some implementations.

FIG. 7 illustrates obtaining request IDs of JSON payloads using a logging tool according to some implementations.

FIG. 8 is a flow diagram illustrating the operations relating to the generation of a JSON schema according to some implementations.

DETAILED DESCRIPTION

The following describes implementations for generating JavaScript Object Notation (JSON) schemas for application programming interface (API) endpoints (e.g., ones that are not documented in a machine understandable schema). As described below, such implementations may do so automatically, based on multiple payloads, and/or with increased privacy, and for API endpoints that have not ever had a JSON schema and/or responsive to changes to API endpoints.

Automatic JSON Schema Generation Using a Schema Builder

Figure 1:
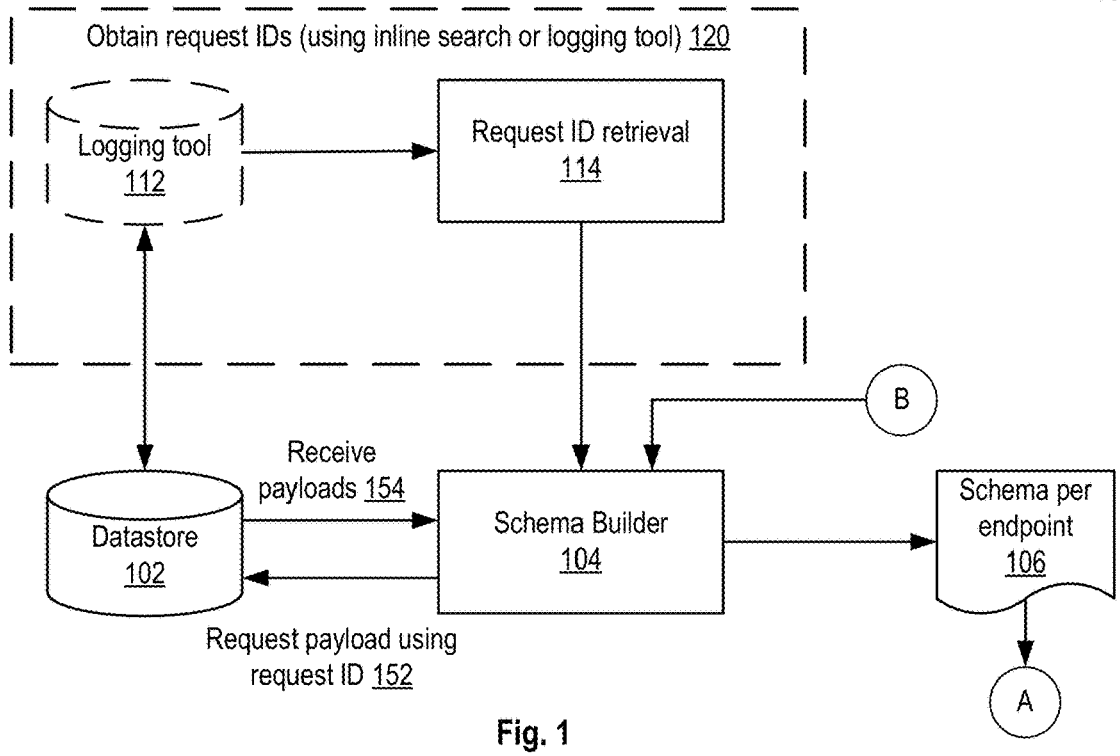
FIG. 1 illustrates the generation of a JSON schema according to some implementations.

FIG. 1 illustrates the generation of a JSON schema according to some implementations. System 100 includes a datastore 102, a schema builder 104, a logging tool 112, a request ID retrieval 114, and a schema per endpoint 106.

The datastore 102 stores JSON payloads. The datastore 102 includes a repository for persistently storing and managing collections of data, which include not just repositories like databases, but also simpler store types such as simple files. The datastore 102 is a database such as HBase or Cassandra in some implementations.

One or more servers (not shown) may request JSON payloads from the datastore 102. The request to the datastore 102 may include a request identifier (ID) that identifies a particular payload, and the datastore 102 retrieves the particular payload based on the request ID, and provides the payload to the requesting server.

For JSON schema generation, the schema builder 104 may also request a JSON payload using a request ID at reference 152. In response, the schema builder 104 receives the requested JSON payload from the datastore 102 at reference 154. The schema builder 104 receives one or more JSON payloads per endpoint, and generates the JSON schema per endpoint at reference 106.

To generate a JSON schema per endpoint, the schema builder 104 operates on multiple payloads of the same endpoints in some implementations. That is, the schema builder 104 may receive request IDs of multiple payloads that share the same endpoint (in other words, for each endpoint for which a JSON scheme is to be generated, the request IDs of multiple payloads are provided to the schema builder 104 in some implementations). The schema builder 104 may receive the request IDs of the payloads in one or more ways depending on the implementation as illustrated at reference 120.

For example, some implementations monitor the interaction between the datastore 102 and the one or more servers in real-time to identify the payloads that share the same endpoint. Such implementations, which may be referred to as inline search implementations, can retrieve the request IDs of the payloads quickly at reference 114. While the fast retrieval is advantageous in some scenarios, the resulting schema per endpoint may not be reliable. For example, the fast retrieval of the request IDs may include a significant number of payloads that result in failed requests.

As another example, some implementations identify the request IDs using a logging tool such as the logging tool 112. The logging tool 112 logs interactions between the datastore 102 and the one or more servers over a period of time, and records whether a request to the datastore 102 results in a failed/successful retrieval by a server. In some implementations, the logging tool 112 may use a Splunk product (such as Splunk Hunk or Insights), ELK Stack, Logstash, Kibana, and/or Elasticsearch. For an example, see FIG. 7.

The request IDs are provided to the schema builder 104, which uses these request IDs to request payloads from the datastore 102 at reference 152. At reference 154, the schema builder 104 receives the payloads that the datastore 102 provides based on these request IDs. The received payloads sharing the same endpoints may be grouped together to generate JSON schemas based on the received payloads so that JSON schemas may be generated on a per endpoint basis. Based on the received payloads for a given endpoint, the schema builder generates a schema 106.

Implementations of the invention provide a system that generates a JSON schema per endpoint automatically. For example, where cloud services are utilized, there may be hundreds even thousands REST API endpoints that have not been documented. The automation saves the man-hours to manually document existing API endpoints that do not comply with standards such as OpenAPI. This automation is in contrast to using the existing solutions that generate a JSON schema one JSON payload (or payload, and the two terms are used interchangeably) at a time. The automatic generation avoids manual generation which is time consuming and error prone. For an example of the efforts involved in a manual generation approach, see discussion relating to FIG. 6A. The automation allows other developers to use these existing API endpoints without tracking down the original developers to learn how these existing API endpoints were structured or manually generate JSON schemas for these existing API endpoints on their own. What is more, when there is a change to an API endpoint, existing solutions would need to generate new JSON schemas for each payload one by one, while the automatic generation allows for updates to be automatically generated as needed.

Figure 2:
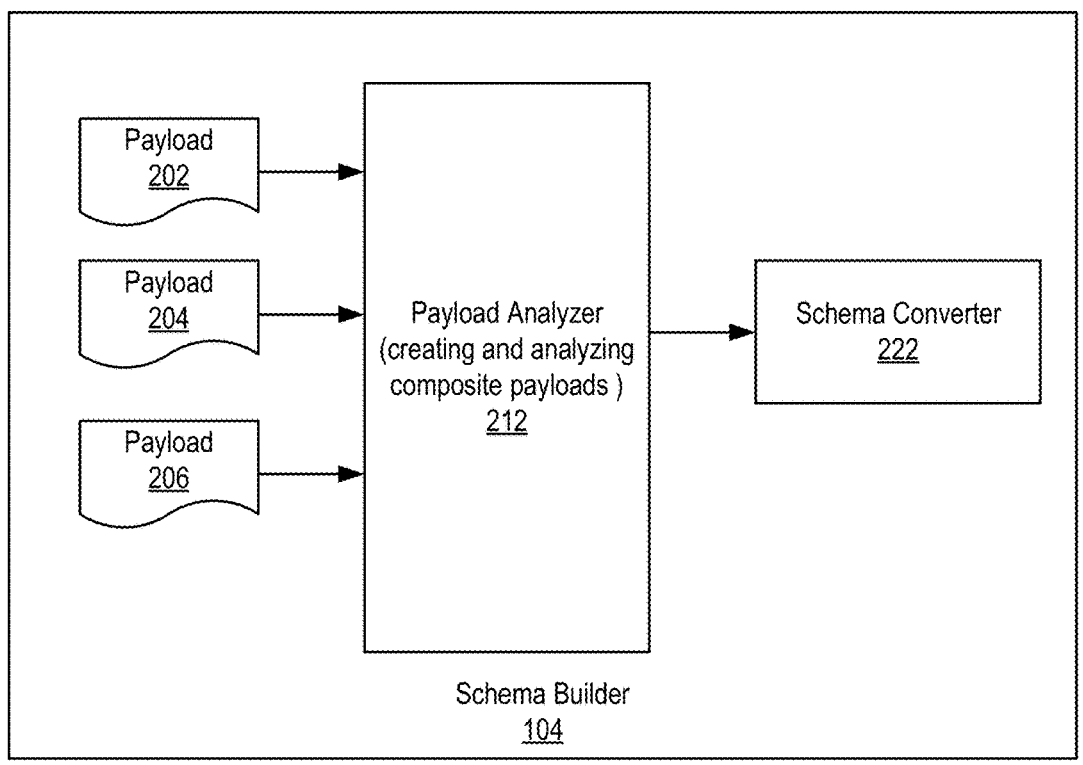
FIG. 2 illustrates operations of a schema builder according to some implementations.

FIG. 2 illustrates operations of a schema builder according to some implementations. The schema builder 104 receives multiple payloads such as payloads 202-206. The payloads are provided to a payload analyzer 212, which works with a schema converter 222 to generate one or more JSON schemas.

The JSON schemas are to be generated on a per endpoint basis. Thus, schema builder 104 may process payloads sharing the same endpoint together. Payloads 202-206 are payloads sharing the same endpoint in this example. In some implementations, the payload analyzer 212 combines these payloads to create a composite payload that includes all the fields (including subfields) and corresponding data items of these fields in the payloads, and then analyzes the composite payload. A single JSON schema based on multiple payloads documents the similarities and differences of the JSON payloads of the same endpoint, and is more efficient than having multiple JSON schema for the multiple payloads. For an example, see FIGS. 6A-B. The existing JSON schema generation tools may be inefficient as many of the payloads may share common characteristics. Not exploring the commonalities among these payloads and having a JSON schema for each payload yields more JSON schemas than necessary. It is hard to maintain a large number of JSON schemas. In addition, maintaining the many JSON schemas that would be generating using existing tools may be impractical.

Figure 3:
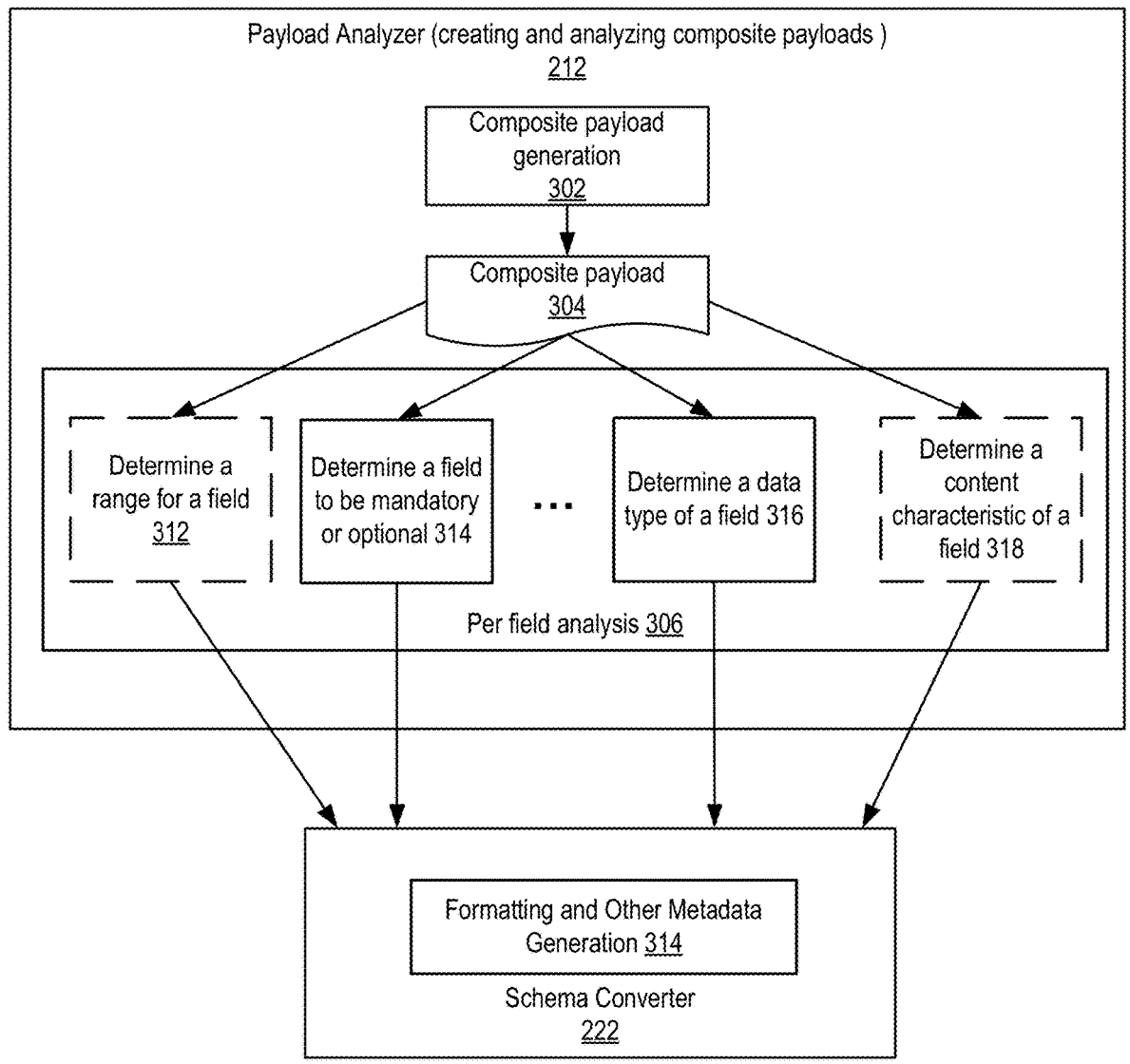
FIG. 3 illustrates details of the operations by a payload analyzer and a schema converter according to some implementations.

FIG. 3 illustrates details of the operations by a payload analyzer and a schema converter according to some implementations. At reference 302, payloads that share the same endpoints are merged (e.g., using a merge by fields) and a composite payload 304 is generated. For examples, see FIGS. 6C-D.

The payload analyzer 212 then performs a per field analysis 306 on the composite payload 304. The per field analysis includes examining all the fields and subfields in the composite payload 304 in some implementations.

The per field analysis 306 may include a number of operations, such as determining a range for a field at reference 312, determining a field to be mandatory or optional at reference 314, determining a data type of a field at reference 316, and determining a content characteristic of a field at reference 318. Each determination may be performed on a portion or all of the fields and subfields in the composite payload 304 in some implementations. These determinations may be performed serially or in parallel. Also, these determinations are exemplary, and more, less, and/or different determinations may be performed on the composite payload 304 depending on the implementation.

The per field analysis may use machine learning to improve the intelligence of the analysis. For example, the content characteristics of a field may be determined using machine learning techniques such as logistic regression, decision tree, neural networks, deep learning, etc.

Once the per field analysis is completed, the payload analyzer 212 provides the determination results to the schema converter 222. The schema converter 222 takes the results, and adds proper format and other metadata to generate a JSON schema. FIG. 6B provides an example of a generated JSON schema. Note that the JSON schema 650 contains metadata such as "paths" that is added by the schema converter 222.

Figure 4A:
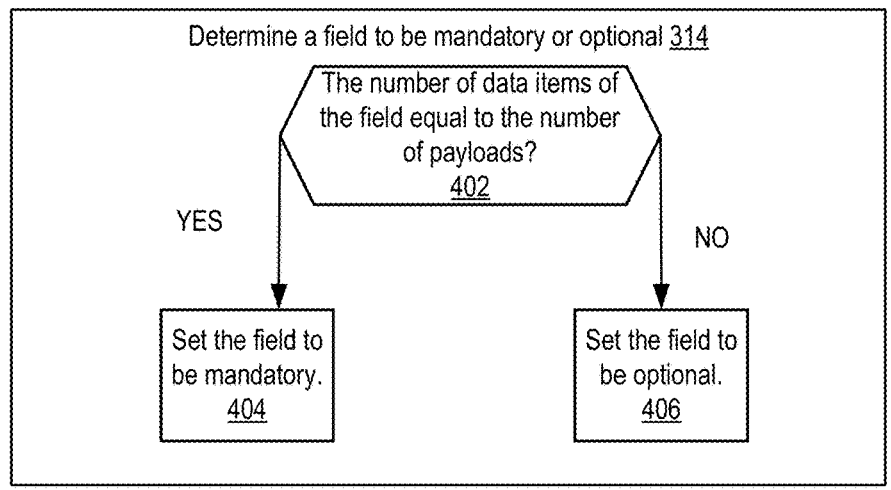
FIG. 4A illustrates the determination of a field to be mandatory or optional according to some implementations.
Figure 4B:
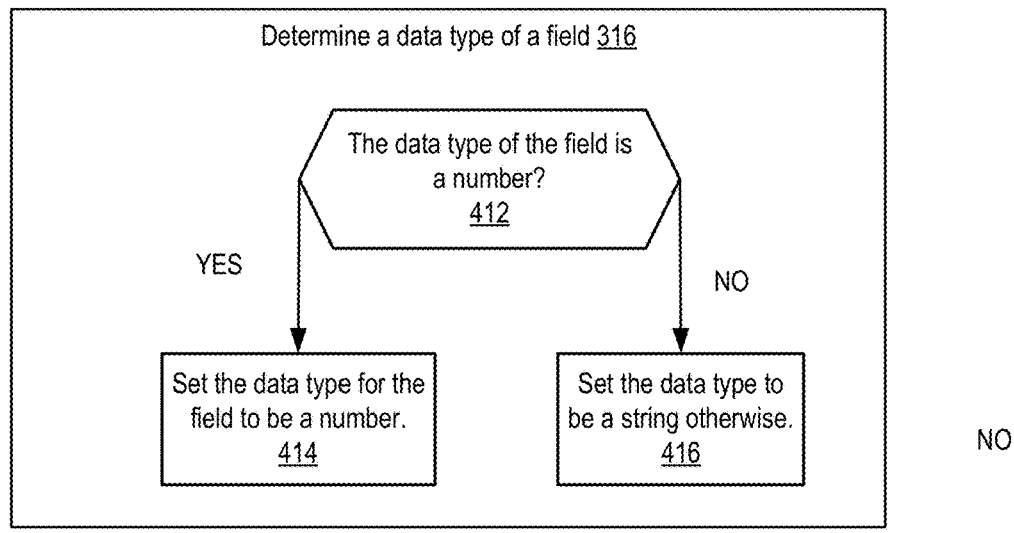
FIG. 4B illustrates the determination of a data type of a field according to some implementations.
Figure 4C:
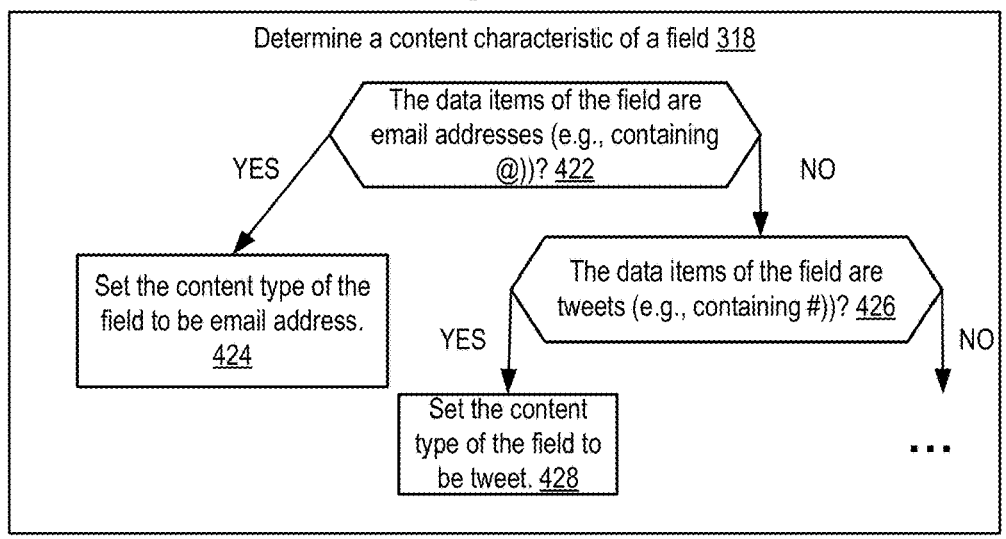
FIG. 4C illustrates the determination of a content characteristics of a field according to some implementations.

FIGS. 4A-4C below discuss some implementations to perform some the determinations of per field analysis 306. FIG. 4A illustrates the determination of a field to be mandatory or optional according to some implementations. The operation within FIG. 4A is an implementation of the determination at reference 314.

At reference 402, it is determined whether the number of data items of the field is equal to the number of payloads. When the number of data items is equal to the number of payloads, the field is set to be mandatory at reference 404, otherwise the field is set to be optional at reference 406. For an example, FIG. 6D.

FIG. 4B illustrates the determination of a data type of a field according to some implementations. The operation within FIG. 4B is an implementation of the determination at reference 316.

At reference 412, it is determined whether the data type of the field is a number. If it is a number, the data type for the field is set to be a number at reference 414. Otherwise the data type of the field may be set to be a string at reference 416. For an example, FIG. 6D.

FIG. 4C illustrates the determination of a content characteristics of a field according to some implementations. The operation within FIG. 4C is an implementation of the determination at reference 318.

At reference 422, it is determined whether the data item(s) of the field are email addresses. The determination may be based on comparing the characteristic(s) of data item(s) with known characteristics of an email address. For example, if each data item of the field in the composite payload includes an @, followed by ".com", ".org", or ".net", the payload analyzer 212 may determine that the content of the field is an email address.

If it's determined that the data item(s) of the field are email addresses, the flow goes to reference 424, and the payload analyzer 212 sets the content type of the field to be an email address. Otherwise the flow goes to reference 426, where it is determined whether the data item(s) of the field are tweets. For example, if each data item of the field in the composite payload includes a #, and the total length of each data item is less than 140 characters (or 280 characters), the payload analyzer 212 may determine that the content of the field is a tweet.

If it's determined that the data items of the fields are tweets, the flow goes to reference 428, and the payload analyzer 212 sets the content type of the field to be a tweet. Otherwise the process may continue and the payload analyzer 212 determines the content characteristics using other criteria. Through such a process, the payload analyzer 212 may determine the content characteristics of a field, and set a content type to be physical location or street address (domestic/international), phone number, text message, etc. Such information may define a JSON schema precisely.

Through operations discussed relating to FIGS. 1-4, the schema builder 104 generates a JSON schema per endpoint. The schema builder 104 may analyze a relatively large number of payloads per endpoint and generate a JSON schema for an endpoint. The schema builder 104 may interact with a production/operational datastore that is actively providing payloads to servers/server clusters and/or otherwise providing services to a platform. The schema builder 104 may generate JSON schemas with a minimum impact on the production/operational datastore, which may provide payloads to servers concurrently with the generation of the JSON schemas.

In some implementations, the schema builder 104 may be configured to generate JSON schemas for only undocumented API endpoints. In which case, the schema builder 104 identifies undocumented API endpoints, and then generates JSON schemas to document these API endpoints. The identification of the undocumented API endpoints may include the schema builder 104 to be configured to recognize existing documented endpoints by searching for them in a directory and excluding them from the JSON schema generation process. For example, the documented endpoints may be marked by another tool.

Additionally or alternatively, the schema builder 104 may be configured to update some or all of the JSON schemas responsive to changes to the corresponding API endpoints (e.g., new parameters/fields are added to these API endpoints). For example, an API endpoint change may be reflected in the changes of payloads retrieved using the API endpoint. The changes of the payloads cause the update of a corresponding composite payload, which results in an updated JSON schema. The automatic adjustment generated by the schema builder 104 makes the maintenance of the JSON schemas much easier than the manually created JSON schemas.

Integration of Schema Builder to a Service Platform

A schema builder that automatically generates JSON schemas per endpoint such as the schema builder 104 may be integrated as part of a service platform. For example, retrieving payloads from a datastore often consumes significant bandwidth (e.g., a datastore may allow only one payload to be retrieved every second), and schema builder 104 may save the retrieved payloads to files/folders so that these payloads may be used for other purposes on the service platform without other services retrieving them from the datastore again.

Figure 5:
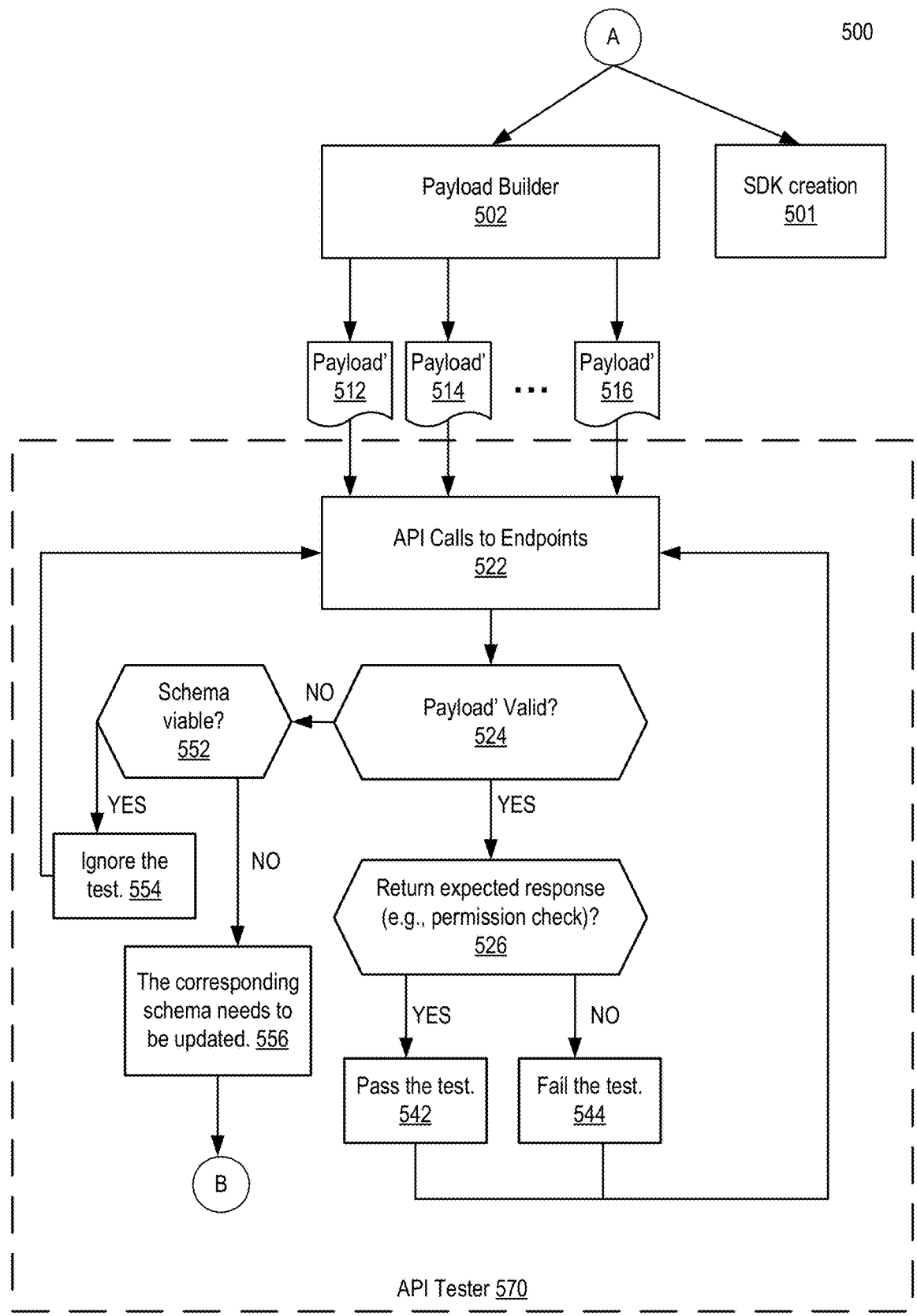
FIG. 5 illustrates an automatically generated JSON schema to be used to test an API and/or to create a SDK according to some implementations.

The JSON schema generated by the schema builder 104 may also be used to test an API endpoint and/or create a software development kit (SDK). FIG. 5 illustrates an automatically generated JSON schema to test an API endpoint and/or to create an SDK according to some implementations.

FIG. 5 is a continuation of FIG. 1, which includes a circled A following the schema per endpoint 106. FIG. 5 starts with the circled A, thus a schema per endpoint was already generated at the start of operations 500 in FIG. 5.

At reference 501, a SDK may be created using the automatically generated JSON schema per endpoint. The SDK generation may use an off-the-shelf SDK development tool, since the generated JSON schema complies with standards. The SDK development tool may convert the JSON schema into code and a developer may use the created SDK for further development work. Note that the payloads saved by the schema builder after their retrieval from a datastore may also be used for the SDK creation.

Additionally, one or more new payloads, apart from the payloads retrieved from the datastore, may be generated by a payload builder 502 for an endpoint. A generated payload (may also be referred to as a pseudo payload as it is not a payload stored in a datastore) is denoted as payload', to differentiate from a retrieved payload. Generated payload's, payload' 512, 514, and 516 are produced from the payload builder 502. A generated payload is consistent with a retrieved payload that is for the same endpoint in that their structures are the same, because the generated payload is generated based on the JSON schema for the same endpoint. See FIG. 6F for an example.

The one or more generated payloads can be used to test an API endpoint through operations in API tester 570. This is in contrast to existing solutions in which a JSON schema is generated one payload at a time, and the user data within the JSON payload may be exposed through the JSON schema during API endpoint testing. Using the generated payloads to test an API endpoint provides better privacy protection to user data as user identifiable information in retrieved payloads is not presented in the generated payloads. Yet the generated payloads follow the same structure as the retrieved payloads, thus the generated payloads are sufficient to test a corresponding API endpoint without exposing user data embedded in the retrieved payloads. In the world that data breach occurs frequently, minimizing user data exposure by using the generated payloads for API test provides advantages over existing solutions. Thus, the automatically generated JSON schema per endpoint (vs. existing solutions for one JSON schema per payload) is more efficient and gives better user data privacy protection.

To test an API endpoint, the generated payloads are provided to API calls to endpoints at reference 522. An API test may test various aspects of an API endpoint. For example, the API test may test permission of an API endpoint. A user may have full permission, partial permission, or no permission to retrieve a payload using the API call. Such permission may be indicated in an API call, which contains a HTTP header that includes user account information to authenticate the user to a server. The server uses the information to determine what permission the user has. The server initiates the API call for a user to obtains the generated payloads.

At reference 524, it is determined whether a generated payload is valid. The validation may include examining whether the generated payload contains fields/subfields or corresponding data items as expected for the API call.

When the generated payload is determined to be invalid, the flow goes to determine whether the schema is viable at reference 552. For example, if only several generated payloads out of several hundreds for an endpoint have been determined to be invalid, the schema will be considered viable. When the schema is still considered viable, the flow goes to reference 554, and the test is ignored. Then the flow returns to reference 522 to run another test.

On the other hand, if say 30% of generated payloads for the endpoint have been determined to be invalid, the schema is considered non-viable. The schema viability test at reference 552 may use one or more thresholds for the valid/invalid payloads', and the thresholds may be a number or a percentage in some implementations.

When it is determined that the schema is not (or was but no longer) viable, the flow goes to reference 556, where it is determined that the corresponding schema needs to be updated, and the flow goes to the circled B. The circled B continues at FIG. 1, where the schema builder 104 updates the corresponding schema. The update may include revising the existing schema, or deleting the existing schema and recreating a new one. The update may use additional payloads retrieved from the datastore 102, and perform the operations discussed relating to FIGS. 1-4. Thus, the schema builder 104 may automatically adjust to API endpoint changes. When an API endpoint changes (e.g., adding a new parameter/field), the change may be reflected in the changes to the payloads retrieved using the API endpoint. The changes to the payloads cause the update of a corresponding composite payload, which results in an updated JSON schema. The automatic adjustment generated by the schema builder 104 makes the maintenance of the JSON schemas much easier than the manually created JSON schemas.

Returning to reference 524, when the generated payload is determined to be valid, the flow goes to reference 526, where it is determined whether the expected response is received. The expected response may be that the expected payload is retrieved based on the user permission. When the API call returns an expected response, the test is passed at reference 542; otherwise the test is failed at reference 544. The flow goes back to reference 522, so the API test may continue. Note that in some implementations, the user that has no permission to retrieve a payload does not receive a generated payload, and the flow skips reference 524 and goes to reference 256 to determine whether the expected response of no payload being received (within a certain time period as defined) becomes true.

Through operations 500, the generated JSON schema may be used for SDK creation and API endpoint testing. Additionally, the generated JSON schema may be examined to improve the use of a corresponding API endpoint since the generated JSON schema may provide detailed information regarding ranges, optionality, data types, and content characteristics of fields/subfields.

By integrating the JSON schema generation in a service platform, implementations of the invention provide a complete way of automation from payload generation and schema generation, to endpoint testing and SDK development. For example, existing solutions do not provide an easy way to generate a JSON schema from a plurality of JSON payloads, to run automation tests based on the schema definition, or to create SDKs in different languages.

EXAMPLES

FIGS. 6A-B provides an example of the inefficiency of generating one JSON schema per one payload. FIG. 6A illustrates a plurality of JSON payloads. In this example, three JSON payloads, payloads 602-606, may be retrieved using the same endpoint. Using existing solutions, three JSON schemas will be generated, each for one payload. Yet these payloads share many of the same or similar fields. For example, a payload 602 named "Bill Albert" and a payload 604 named "Ryan Howe" have the same fields except that the latter has a "slots" field that the former does not have; and payload 604 named "Ryan Howe" has the same fields as a payload 606 named "Tony Oaks" except that the latter has a "design" field that the former does not have. Generating three JSON schemas for these JSON payloads without exploring the commonalities among these payloads may be inefficient.

Instead, some implementations generate one JSON schema based on a composite payload generated from merging payloads 602-606, and this one JSON schema includes all the fields (a field may include one or more subfields) of the JSON payloads that were merged. In certain implementations, this JSON schema also indicates the mandatory fields and the optional fields. In this example, the "slots" and "design" fields are optional and the rest fields are mandatory in the generated single JSON schema based on payloads 602-606. Additionally, the JSON schema may indicate subfields to be mandatory or operational.

Such JSON schema based on multiple payloads documents the similarities and differences of the JSON payloads of the same endpoint, and is more efficient than the multiple JSON schema for the multiple payloads.

FIG. 6B illustrate a JSON schema based on multiple payloads. The single JSON schema 650 is based on payloads 602-606. Note that some fields (e.g., "file") and subfields (e.g., subfield "id" under field "category") are indicated as mandatory ("'required': true") in JSON schema 650, while others (e.g., "slots") are indicted as optional ("'required': false").

Figure 6C:
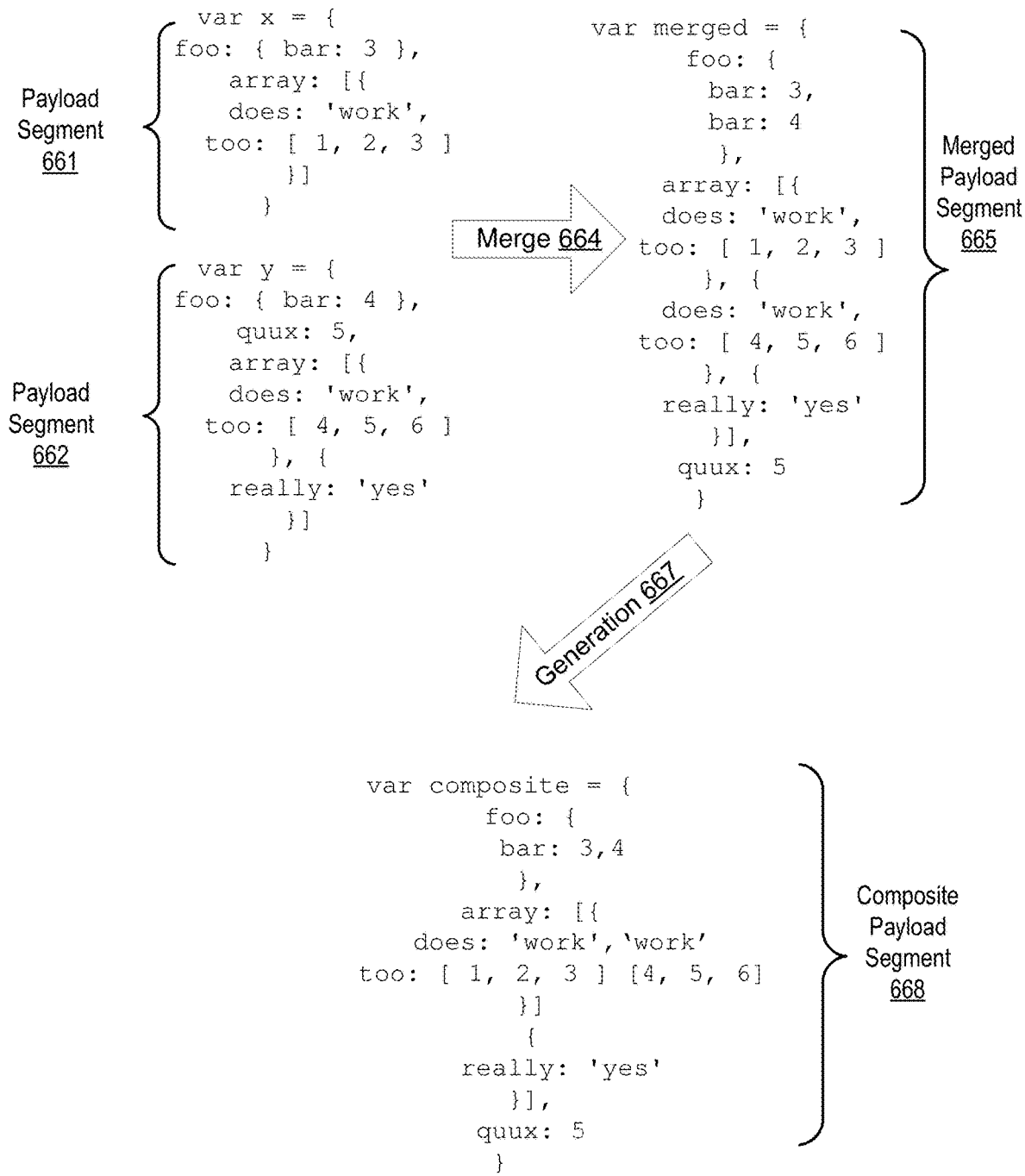
FIG. 6C provides an example of payload merging and composite payload generation according to some implementations.

FIG. 6C provides an example of payload merging and composite payload generation according to some implementations. These operations may be performed by the payload analyzer 212 in some implementations. Two payload segments, 661 and 662, each belongs to a payload sharing the same endpoint. The payload segments 661 and 662 both have a field foo, which includes several subfields. Note that payload segment 662 has a subfield "quux" that is not in payload segment 661.

Through a merge by field at reference 664, a merged payload segment 665 is generated. The merged payload segment 665 contains all the fields, subfields, and their corresponding data items of the original payload segments 661 and 662. The data items, such as values 3 and 4 for the subfield "bar," are listed separately in different rows but next to each other. The subfield "quux" is included in the merged payload segment 665, even though it is in the payload segment 662 only.

Then the merged payload segment 665 is converted at reference 667 to a composite payload segment 668. In the composite payload segment 668, data items for the same fields or subfields are listed together. For example, the values 3, 4 for the subfield "bar" are listed together in the same row. Such composition shows the range for a field or subfield. In other words, the range for a field may be determined based on values of a field of a composite payload. For example, in FIG. 6C, the subfield "bar" has the values 3 and 4. When more payloads are combined together, more values for the subfield "bar" are collected and the range for "bar" can be determined more accurately. These operations may be performed by the payload analyzer 212 in some implementations. FIG. 6D illustrates a composite payload according to some implementations. The composite payload 670 is the composite payload of payloads 602, 604, and 606 of FIG. 6A. Note that all the fields, subfields, and their corresponding data items are included in the composite payload 670.

For example, the composite payload 670 in FIG. 6D is the composition of three payloads, 602-606. The field "name" has three data items: "Ryan Howe", "Bill Albert", and "Tony Oaks". Since the number of data items is equal to the number of payloads, the field "name" is a mandatory field as indicated by reference 672 in FIG. 6D. In contrast, the field "slots" has two data items: ["worker-composite-2"] and ["worker-composite-4"]. Since the number of data items here is less than the number of payloads, the field "slots" is an optional field as indicated by reference 674. These operations may be performed by the payload analyzer 212 in some implementations (e.g., see reference 314 of FIG. 3 and/or FIG. 4).

For example, the composite payload 670 in FIG. 6D has a field "id" that includes data items that are numbers 1022, 1023, and 1022. Since the data items are numbers, the data type for "id" is set to be a number data type as indicated by reference 676 in FIG. 6D. In contrast, the field "displayName" includes data items that are not numbers: JPEG, PNG, and JPEG. Thus, the data type for "displayName" is set to be a string data type as indicated by reference 678. These operations may be performed by the payload analyzer 212 in some implementations (e.g. see reference 316 of FIG. 3 and/or FIG. 4).

FIG. 6E illustrates a schema segment that specifies a range for a field according to some implementations. The schema segment 680 is for the field "id." As illustrated, the field has no description (" "), and the type of data item is a number, and it is a mandatory field ("'required': true"). The field has a range of a maximum value of 10,000 and minimum value of 1. These operations may be performed by the payload analyzer 212 in some implementations (see reference 312 of FIG. 3).

FIG. 6F compares a generated payload to a retrieved payload according to some implementations. The generation of a payload may be performed by the payload builder 502 in some implementations. Payload' 690 is a generated payload that is compared side-by-side to payload 602 (illustrated earlier in FIG. 6A). Payload' 690 has the same structure as payload 602, with the same fields and subfields. Yet payload' 690 does not contain the data items providing identifiable information that may raise privacy concerns. For example, the first and last name "Bill Albert" in payload 602 are replaced with a randomly generated string including a space "SCuQ XkUQWmSu" in the generated payload' 690; and the file name "Tortoise.png" that offers a hint of the file content is replaced with a string "SidA8.jwp" that provides no insight of what the file content might be. Payload' 690 contains all the fields and subfields of payload 602, but some data items corresponding to the fields and subfields are replaced with randomly/pseudo-randomly generated data items. The generated data items may have values within the range of the fields/subfields; and they have the same data type and content characteristics of that of data items in the fields/subfields in corresponding retrieved payloads. Additionally, some generated payloads of an endpoint contain optional fields/subfields and data items generated for the optional fields/subfields, and others of the same endpoint do not. Thus, a plurality of generated payloads for an endpoint may mimic a plurality of retrieved payload for the same endpoint.

FIG. 7 illustrates obtaining request IDs of JSON payloads using a logging tool according to some implementations. This example uses Splunk, and a Splunk query command is issued to a Splunk product to retrieve a set of requests for JSON payloads. The query command input 702 is "index=apilog rs.s=200 a=asset|table v,a,r.m,r.r,i|dedup 3 r.r,v,r.m," and its parameters and corresponding parameter values are explained below.

The first parameter, index, indicates that the query is for the apilog, which is the log tracking the requests for JSON payloads. The next parameter, rs.s, indicates that the query is to identify requests that have returned code 200, which indicates successful requests (i.e., the request has shown consistently to be for valid payloads). The logging tool tracks whether a request to the datastore is successful or failed and provides an indication for the result of the request.

The next parameter, a, indicates a specific API service that the query targets. In this case, the targeted API service is asset. Each of the stored payloads may be for one of many API services such as asset, automation, contacts, data, email, event, hub, interaction, messaging, odata (open data protocol), ott (over-the-top), platform, provisioning, push, sites, and sms (short message service).

The next parameter, table v,a,r.m,r.r,i, indicates that the query outputs its result in a table form, and the table contains columns v, a, r.m, r.r, and i. FIG. 7 illustrates a portion of a comma-separated values (CSV) file output 704, which is in a table form. Within the table, v identifies the server (or a server cluster containing one or more servers) from which a request comes. In this example, the requesting server is s1. The next column is a, indicating the API service asset that the query targets as discussed above. The following column is r.m (request method), indicating the method used for a request. The next column is r.r (request route), indicating the route used to make a request. Note that a request method and a request route together identify an endpoint. The last column is i (ID), indicating the request ID used to obtain a payload.

The last parameter of the query command input 702 specifies how to deduplicate requests in the query. A logging tool may store many duplicated requests over time, and using duplicated requests that share the same characteristics to generate a JSON schema is counterproductive. Thus, the query command input 702 specifies "dedup 3 r.r, v, r.m" that requests the query to return only three copies of the requests per request route, server, and request method.

The query command input 702 is provided to the logging tool. The responsive query result includes information concerning the successful requests, including their server(s) of origin (the server(s) from which the requests were sent), their routes and methods, and their request IDs. For example, the responsive query result includes the content of the CSV file output 704. In some implementations, the schema builder 104 provides one query per API service, so that one file output is generated for the API service. For example, the CSV file output 704 is for the API service asset. The schema builder 104 then has a number of files, each for an API service. Different file output may be provided by the logging tool in some implementations.

Obviously other parameters and/or other values of the discussed parameters may be utilized for a query to the logging tool. Some parameters may have no values. For example, when duplicated requests are not a concern, deduplication through "dedup" may not be necessary. The selection of the parameters and the values (e.g., the number of successes and the number of copies of requests) of these parameters may adjusted based on the characteristics of the logging tool (e.g., how quickly the logging tool executes a query) and the datastore (e.g., how many payloads stored in the datastore).

The request IDs of the requests to the datastore 102, selected using the query command, are then obtained from the logging tool. The request IDs may be classified based on request methods and request routes (see columns r.m and r.r of FIG. 7), which together specify endpoints. Thus, the obtained request IDs may be grouped per endpoint.

Operation of Some Implementations

The operations in the flow diagrams FIGS. 8-9 will be described with reference to the exemplary implementations of the other figures. However, it should be understood that the operations of the flow diagrams can be performed by implementations other than those discussed with reference to the other figures, and the implementations discussed with reference to these other figures can perform operations different than those discussed with reference to the flow diagrams.

FIG. 8 is a flow diagram illustrating the operations relating to the generation of a JSON schema according to some implementations. Method 800 may be performed using a JSON schema builder such as the schema builder 104 and may be used to generate a JSON schema for an application programming interface (API) endpoint that is not documented in a machine understandable schema. A datastore stores JSON payloads, and the JSON payloads are retrieved by a set of one or more servers using the API endpoint.

At reference 802, a plurality of JSON payloads that were successfully requested using a same endpoint are automatically obtained. Each of the plurality of JSON payload includes a set of one or more fields and a data item for each of those fields. Examples of the JSON payloads are payloads 602, 604, and 606 in FIG. 6A.

In some implementations, the plurality of the JSON payloads are retrieved using a logging tool. The logging tool maintains a log of interactions between the set of servers and the datastore. The obtaining includes identifying from a log, log entries that each records an endpoint and an indication of success for a request (e.g., using a status code indicating whether the request was received, understood, accepted, and/or processed successfully) to the JSON payloads, a plurality of the requests to the same endpoint that were successful per the indications at reference 812. Then at reference 814, the plurality of JSON payloads are obtained from the datastore of the plurality of the requests identified as having the same endpoint and that were successful per the indications. In some implementations, the identification of the plurality of the requests also includes removing one or more duplicated requests from the plurality of the requests.

FIG. 7 and related discussion provide examples of the retrieval of the JSON payloads using the logging tool and removal of the duplicated requests. Note that using the logging tool is one way to retrieve the plurality of the JSON payloads, and an alternative way uses an inline search to retrieve the plurality of the JSON payloads.

Note that the set of fields of at least two of the plurality of JSON payloads is different in some implementations. For example, payload 604 has a "slots" field that payload 602 does not have. Also, the set of fields of at least two of the plurality of JSON payloads includes a same field but different data items for that same field in some implementations. For example, for the same field, name, payloads 602 and 604 have data items "Bill Albert" and "Ryan Howe" respectively.

At reference 804, a composite payload is automatically created based on the plurality of JSON payloads that were obtained. The composite payload includes the fields and the respective data items for the fields in the plurality of JSON payloads that were obtained. In some implementations, the composite payload contains a field entry for every unique field name found that were obtained, and each of the field entries has a data item entry for every one of the plurality of JSON payloads having that field name. An example of the composite payload is the composite payload 670 in FIG. 6D.

At reference 806, a JSON schema that documents the API endpoint is automatically generated based on the composite payload. The generation includes for each field of the composite payload, determining whether the field is optional or mandatory based on a number of the data items that are in the composite payload for the field at reference 816, and determining a data type of the field based on the data items in the composite payload for the field at reference 818.

Optionally, the generation also includes one or more of, determining for each field of the composite payload, a range for that field based on the data items for that field in the composite payload at reference 820, and determining a content characteristic for the field based on the data items for that field in the composite payload.

The determinations at references 816-822 are discussed in more details relating to references 312-318 in FIG. 3.

Optionally at reference 814, a software development kit (SDK) is created using the JSON schema. The creation of the SDK is discussed in more details relating to reference 501 in FIG. 5.

Figure 9:
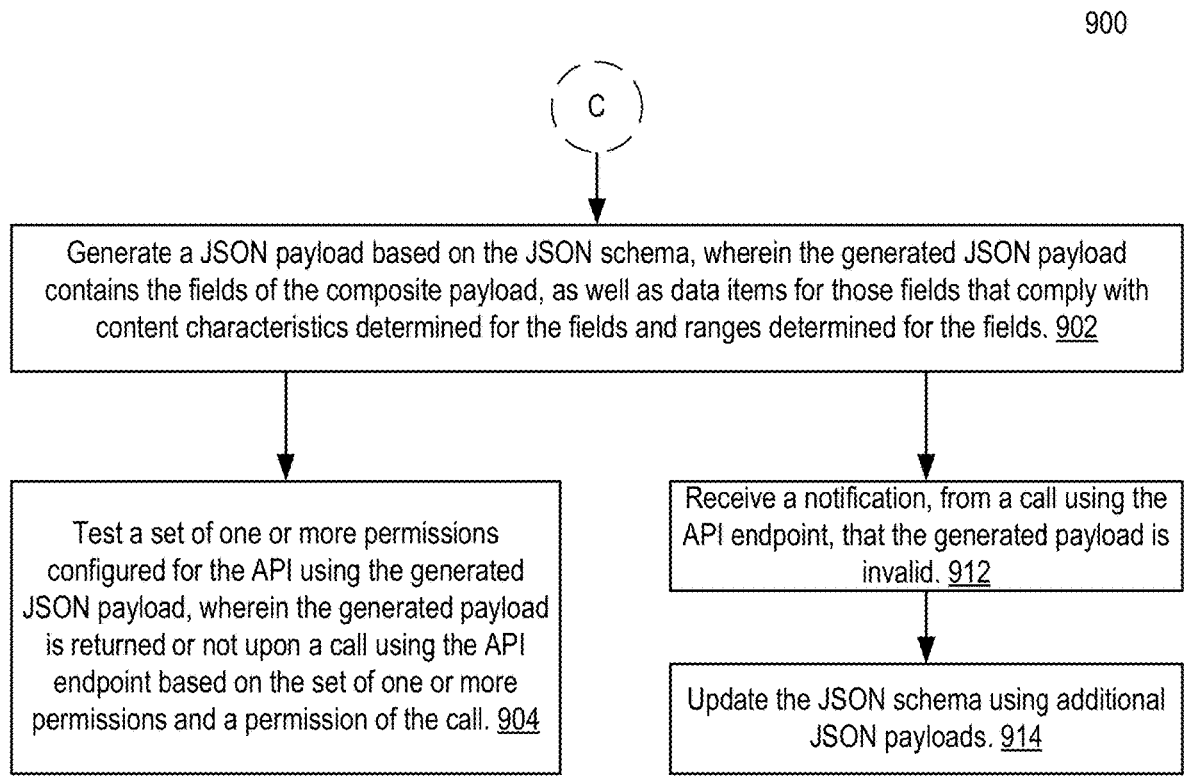
FIG. 9 is a flow diagram illustrating the testing of an API using a JSON schema according to some implementations.

FIG. 9 is a flow diagram illustrating the operations relating to the test of an API endpoint using a JSON schema according to some implementations. Method 900 is a continuation of method 800 in some implementations, and the circled C in FIG. 8, which is also illustrated in FIG. 9, is the starting point of method 900 in some implementations.

At reference 902, a JSON payload is generated based on an automatically generated JSON schema. The generated JSON payload contains the fields of the composite payload, as well as data items for those fields that comply with content characteristics determined for the fields and ranges determined for the fields. For example, the JSON schema can be schema 650 in FIG. 6B, the composite payload can be composite payload 670 in FIG. 6D, and the generated JSON payload can be payload' 690 in FIG. 6F.

At reference 904, a set of one or more permissions configured for the API endpoint is tested using the generated JSON payload, where the generated payload is returned or not upon a call using the API endpoint based on the set of one or more permissions and a permission of the call.

Additionally or alternatively, a notification is received from a call using the API endpoint, and the notification indicates that the generated payload is invalid at reference 912, and the JSON schema is updated using additional JSON payloads at reference 914. The operation of the API test is discussed in more details relating to FIG. 5.

Exemplary Deployments

"Cloud computing" services provide shared resources, software, and information to computers and other devices upon request. In cloud computing environments, software can be accessible over the internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Databases may be implemented according to a variety of different database models, such as relational, non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In some implementations of a cloud database (a database that runs on a cloud platform and that is provided as a database service), identifiers are used instead of database keys, and relationships are used instead of foreign keys. While implementations may use one or more types of databases, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs. By way of example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

While the exemplary implementations may include an on-demand database service environment provided by an application server with a front end for an on-demand database service capable of supporting multiple tenants, alternative implementations are within the spirit and scope of the appended claims (e.g., other database architectures may be used, such as ORACLE® or DB2® by IBM).

A "reference" refers to a piece of data useable to locate a data structure and may be implemented a variety of ways (e.g., a pointer, an index, a handle, a key, an identifier, etc.)

The term "query plan" generally refers to one or more operations used to access information in a database management system.

Receipt of data by the system may occur differently in different implementations (e.g., it may be pushed to the system (often referred to as a push model), pulled by the system (often referred to as a pull model), etc.)

A dataset may be stored in a flat database structure (e.g., a single table (or database object) or as a single record, which is separated by delimiters, such as tabs or commas (e.g., Comma-Separated Values (CSV) or JavaScript Object Notation (JSON) file)), a set of relational database tables (or database objects) or in another type of database structure or data format.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

A "user profile" or "user's profile" is generally configured to store and maintain data about a given user. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the multi-tenant system that provides a service.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 10A:
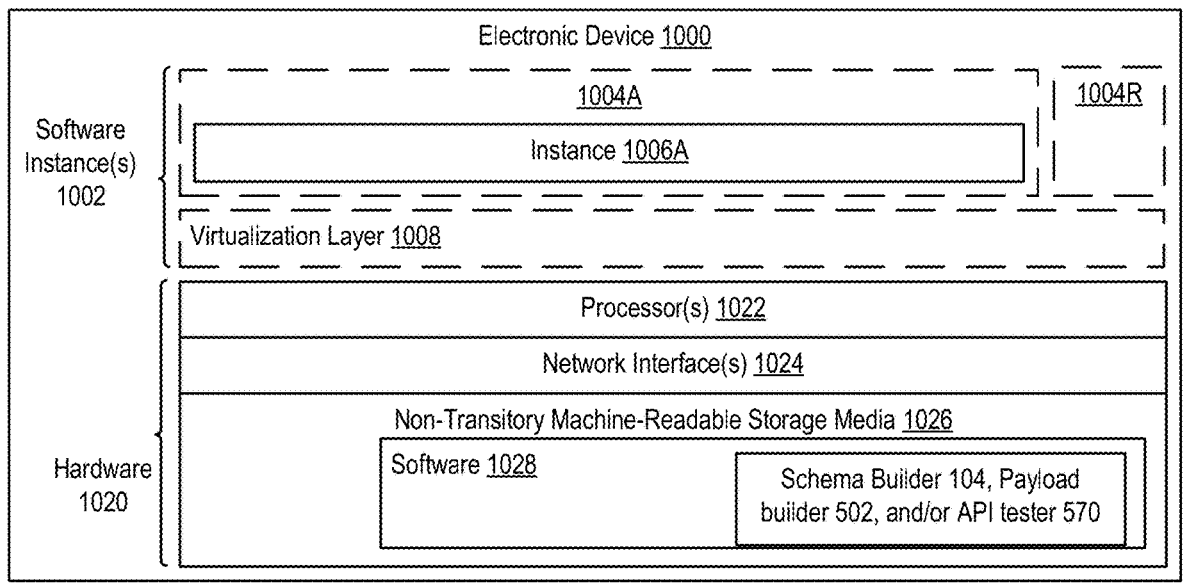
FIG. 10A is a block diagram illustrating an electronic device according to some example implementations.

FIG. 10A is a block diagram illustrating an electronic device 1000 according to some example implementations. FIG. 10A includes hardware 1020 comprising a set of one or more processor(s) 1022, a set of one or more network interfaces 1024 (wireless and/or wired), and non-transitory machine-readable storage media 1026 having stored therein software 1028 (which includes instructions executable by the set of one or more processor(s) 1022). Each of the previously described end user clients and the schema builder 104, the payload builder 502, and the API tester 570, may be implemented in one or more electronic devices 1000. In one implementation: 1) each of the end user clients is implemented in a separate one of the electronic devices 1000 (e.g., in user electronic devices operated by users where the software 1028 represents the software to implement end user clients to interface with the schema builder 104, the payload builder 502, and the API tester 570 (e.g., a web browser, a native client, a portal, a command-line interface, and/or an application program interface (API) based upon protocols such as Simple Object Access Protocol (SOAP), Representational State Transfer (REST), etc.)); 2) one or more of the schema builder 104, the payload builder 502, and the API tester 570 are implemented in a separate set of one or more of the electronic devices 1000 (e.g., a set of one or more server electronic devices where the software 1028 includes the software to implement the schema builder 104, the payload builder 502, and the API tester 570); and 3) in operation, the electronic devices implementing the end user clients and the schema builder 104, the payload builder 502, and the API tester 570 would be communicatively coupled (e.g., by a network) and would establish between them (or through one or more other layers) connections for submitting requests for schema generation, payload generation, and/or API testing to the schema builder 104, the payload builder 502, and the API tester 570, and returning one or more JSON schemas, one or more generated payloads, and or one or more API test results to the end user clients. Other configurations of electronic devices may be used in other implementations (e.g., an implementation in which the end user client and the schema builder 104, the payload builder 502, and the API tester 570 are implemented on a single electronic device 1000).

In electronic devices that use compute virtualization, the set of one or more processor(s) 1022 typically execute software to instantiate a virtualization layer 1008 and software container(s) 1004A-R (e.g., with operating system-level virtualization, the virtualization layer 1008 represents the kernel of an operating system (or a shim executing on a base operating system) that allows for the creation of multiple software containers 1004A-R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1028 (illustrated as instance 1006A) is executed within the software container 1004A on the virtualization layer 1008. In electronic devices where compute virtualization is not used, the instance 1006A on top of a host operating system is executed on the "bare metal" electronic device 1000. The instantiation of the instance 1006A, as well as the virtualization layer 1008 and software containers 1004A-R if implemented, are collectively referred to as software instance(s) 1002.

Alternative implementations of an electronic device may have numerous variations from that described above. For example, customized hardware and/or accelerators might also be used in an electronic device.

Figure 10B:
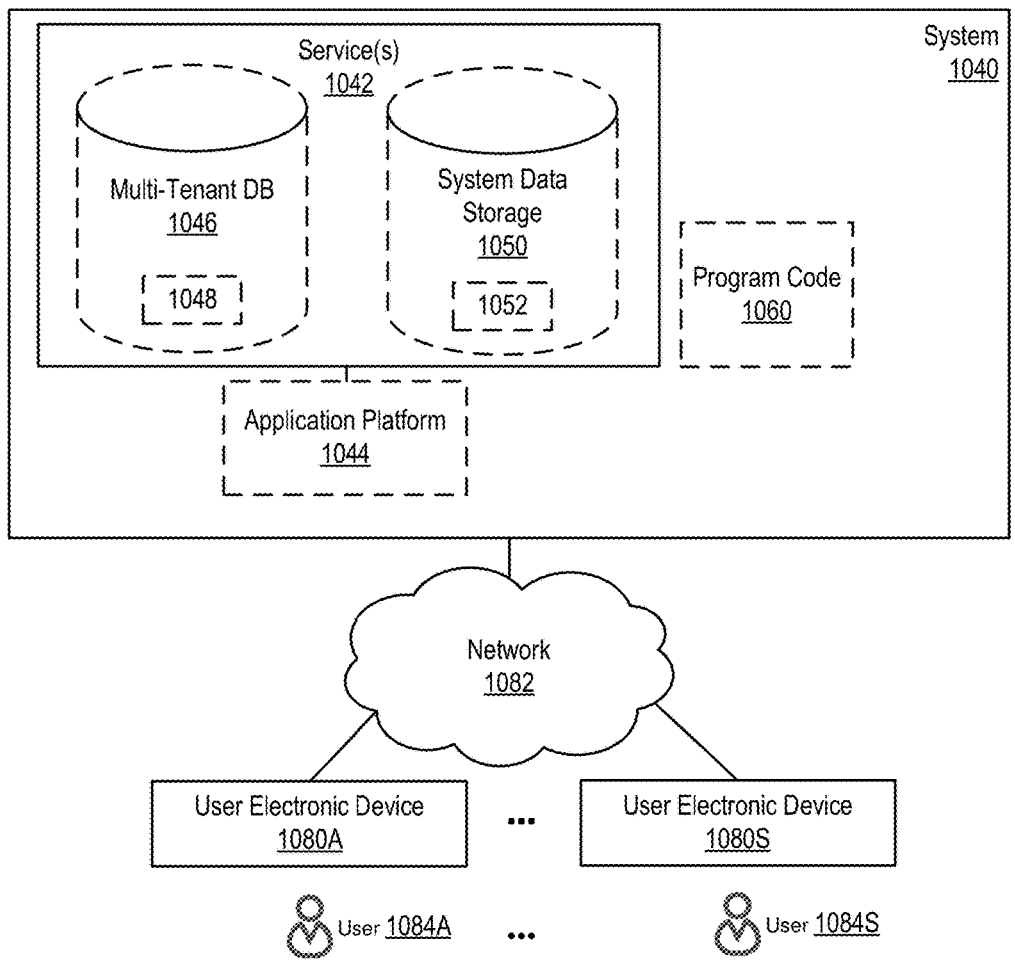
FIG. 10B is a block diagram of an environment where one or more of a schema builder, a payload builder, and an API tester may be deployed, according to some implementations.

FIG. 10B is a block diagram of an environment where one or more of a schema builder, a payload builder, and an API tester may be deployed, according to some implementations. The schema builder, the payload builder, and the API tester may be the schema builder 104, the payload builder 502, and the API tester 570, respectively. A system 1040 includes hardware (a set of one or more electronic devices) and software to provide service(s) 1042, including the schema builder 104, the payload builder 502, and the API tester 570. The system 1040 is coupled to user electronic devices 1080A-S over a network 1082. The service(s) 1042 may be on-demand services that are made available to one or more of the users 1084A-S working for one or more other organizations (sometimes referred to as outside users) so that those organizations do not need to necessarily be concerned with building and/or maintaining a system, but instead makes use of the service(s) 1042 when needed (e.g., on the demand of the users 1084A-S). The service(s) 1042 may communicate with each other and/or with one or more of the user electronic devices 1080A-S via one or more Application Programming Interface(s) (APIs) (e.g., a Representational State Transfer (REST) API). The user electronic devices 1080A-S are operated by users 1084A-S.

In one implementation, the system 1040 is a multi-tenant cloud computing architecture supporting multiple services, such as a schema generation and API test service (including one or more of the schema builder 104, the payload builder 502, and the API tester 570), a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1040 may include an application platform 1044 that enables PAAS for creating, managing, and executing one or more applications developed by the provider of the application platform 1044, users accessing the system 1040 via one or more of user electronic devices 1080A-S, or third-party application developers accessing the system 1040 via one or more of user electronic devices 1080A-S.

In some implementations, one or more of the service(s) 1042 may utilize one or more multi-tenant databases 1046, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). In some implementations, the set of one or more servers are the ones that retrieve payloads from a datastore as discussed above relating to FIG. 1. The user electronic device 1080A-S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the one or more multi-tenant database 1046 and/or system data storage 1050.

In some implementations, the service(s) 1042 are implemented using virtual applications dynamically created at run time responsive to queries from the user electronic devices 1080A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the XYZ service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1040 and the user electronic devices 1080A-S.

Each user electronic device 1080A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1040. For example, the user interface device can be used to access data and applications hosted by system 1040, and to perform searches on stored data, and otherwise allow a user 1084 to interact with various GUI pages that may be presented to a user 1084. User electronic devices 1080A-S might communicate with system 1040 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1080A-S might include an HTTP client, commonly referred to as a "browser," for sending and receiving HTTP messages to and from server(s) of system 1040, thus allowing users 1084 of the user electronic device 1080A-S to access, process and view information, pages and applications available to it from system 1040 over network 1082.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for generating a JavaScript Object Notation (JSON) schema for an application programming interface (API) endpoint that is not documented in a machine understandable schema, wherein a datastore stores JSON payloads, wherein the JSON payloads are retrieved by a set of one or more servers using the API endpoint, the method comprising:

automatically obtaining a plurality of JSON payloads that were successfully requested using a same API endpoint, wherein each of the plurality of JSON payloads includes a set of one or more fields and a data item for each of those fields;

automatically creating a composite payload based on the plurality of JSON payloads that were obtained, wherein the composite payload includes the fields and the respective data items for the fields in the plurality of JSON payloads that were obtained; and automatically generating a JSON schema that documents the same API endpoint based on the composite payload;

wherein generating the JSON schema comprises for each field of the composite payload:

determining whether the field is optional or mandatory based on a number of the data items that are in the composite payload for the field; and determining a data type of the field based on the data items in the composite payload for the field.

2. The method of claim 1, wherein a logging tool maintains a log of interactions between the set of servers and the datastore, and wherein the automatically obtaining includes, identifying from a log, which records an endpoint and an indication of success for each request to the JSON payloads, a plurality of the requests to the same API endpoint that were successful per the indications; and obtaining the plurality of JSON payloads from the datastore of the plurality of the requests identified as having the same API endpoint and that were successful per the indications.

3. The method of claim 2, wherein the identifying the plurality of the requests to the same API endpoint comprises:

removing one or more duplicated requests from the plurality of the requests.

4. The method of claim 1, wherein the set of fields of at least two of the plurality of JSON payloads is different, and wherein the set of fields of at least two of the plurality of JSON payloads includes a same field but different data items for that same field.

5. The method of claim 1, wherein the composite payload contains a field entry for every unique field name found that were obtained, and wherein each of the field entries has a data item entry for every one of the plurality of JSON payloads having that field name.

6. The method of claim 1, wherein the generating the JSON schema further comprises for at least one of the fields of the composite payload:

determining a range for that field based on the data items for that field in the composite payload.

7. The method of claim 1, wherein the generating the JS ON schema further comprises for each field:

determining a content characteristic for the field based on the data items for that field in the composite payload.

8. The method of claim 1, further comprising:

creating a software development kit (SDK) using the JSON schema.

9. The method of claim 1, further comprising:

generating a JSON payload based on the JSON schema, wherein the generated JSON payload contains the fields of the composite payload, as well as data items for those fields that comply with content characteristics determined for the fields and ranges determined for the fields.

10. The method of claim 9, further comprising:

testing a set of one or more permissions configured for the same API endpoint using the generated JSON payload, wherein the generated payload is returned or not upon a call using the same API endpoint based on the set of one or more permissions and a permission of the call.

11. The method of claim 9, further comprising:

receiving a notification, from a call using the same API endpoint, that the generated payload is invalid; and updating the JSON schema using additional JSON payloads.

12. A non-transitory machine-readable storage medium that provides instructions for generating a JavaScript Object Notation (JSON) schema for an application programming interface (API) endpoint that is not documented in a machine understandable schema, wherein a datastore stores JSON payloads, wherein the JSON payloads are retrieved by a set of one or more servers using the API endpoint, and the instructions, when executed by a processor, cause said processor to perform operations comprising:

automatically obtaining a plurality of JSON payloads that were successfully requested using a same API endpoint, wherein each of the plurality of JSON payloads includes a set of one or more fields and a data item for each of those fields;

automatically creating a composite payload based on the plurality of JSON payloads that were obtained, wherein the composite payload includes the fields and the respective data items for the fields in the plurality of JSON payloads that were obtained; and automatically generating a JSON schema that documents the same API endpoint based on the composite payload;

wherein generating the JSON schema comprises for each field of the composite payload:

determining whether the field is optional or mandatory based on a number of the data items that are in the composite payload for the field; and determining a data type of the field based on the data items in the composite payload for the field.

13. The non-transitory machine-readable storage medium of claim 12, wherein a logging tool maintains a log of interactions between the set of servers and the datastore, and wherein the automatically obtaining includes, identifying from a log, which records an endpoint and an indication of success for each request to the JSON payloads, a plurality of the requests to the same API endpoint that were successful per the indications; and obtaining the plurality of JSON payloads from the datastore of the plurality of the requests identified as having the same API endpoint and that were successful per the indications.

14. The non-transitory machine-readable storage medium of claim 12, the operations further comprising:

generating a JSON payload based on the JSON schema, wherein the generated JSON payload contains the fields of the composite payload, as well as data items for those fields that comply with content characteristics determined for the fields and ranges determined for the fields.

15. The non-transitory machine-readable storage medium of claim 14, the operations further comprising:

testing a set of one or more permissions configured for the same API endpoint using the generated JSON payload, wherein the generated payload is returned or not upon a call using the same API endpoint based on the set of one or more permissions and a permission of the call.

16. An apparatus comprising:

a processor and a non-transitory machine-readable storage medium that provides instructions for generating a JavaScript Object Notation (JSON) schema for an application programming interface (API) endpoint that is not documented in a machine understandable schema, wherein a datastore stores JSON payloads, wherein the JSON payloads are retrieved by a set of one or more servers using the API endpoint, and the instructions, when executed by the processor, cause the processor to perform operations comprising:

automatically obtaining a plurality of JSON payloads that were successfully requested using a same API endpoint, wherein each of the plurality of JSON payloads includes a set of one or more fields and a data item for each of those fields;

automatically creating a composite payload based on the plurality of JSON payloads that were obtained, wherein the composite payload includes the fields and the respective data items for the fields in the plurality of JSON payloads that were obtained; and automatically generating a JSON schema that documents the same API endpoint based on the composite payload;

wherein generating the JSON schema comprises for each field of the composite payload:

determining whether the field is optional or mandatory based on a number of the data items that are in the composite payload for the field; and determining a data type of the field based on the data items in the composite payload for the field.

17. The apparatus of claim 16, wherein the generating the JSON schema further comprises for at least one of the fields of the composite payload:

determining a range for that field based on the data items for that field in the composite payload.

18. The apparatus of claim 16, wherein the generating the JSON schema further comprises for at least one of the fields of the composite payload:

determining a content characteristic for the field based on the data items for that field in the composite payload.

19. The apparatus of claim 16, the operations further comprising:

creating a software development kit (SDK) using the JSON schema.

20. The apparatus of claim 16, the operations further comprising:

generating a JSON payload based on the JSON schema, wherein the generated JSON payload contains the fields of the composite payload, as well as data items for those fields that comply with content characteristics determined for the fields and ranges determined for the fields.

* * * * *